United States Patent
Richardson et al.

(10) Patent No.: US 8,638,681 B2
(45) Date of Patent: Jan. 28, 2014

(54) METHODS AND APPARATUS TO PERFORM JAMMING BASED ON SIGNAL AND INTERFERENCE IN PEER-TO-PEER NETWORKS

(75) Inventors: Thomas Richardson, South Orange, NJ (US); Shailesh Patil, Bridgewater, NJ (US); Xinzhou Wu, Monmouth Junction, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 490 days.

(21) Appl. No.: 12/875,321

(22) Filed: Sep. 3, 2010

(65) Prior Publication Data

US 2012/0057475 A1   Mar. 8, 2012

(51) Int. Cl.
    *H04L 12/413*   (2006.01)
(52) U.S. Cl.
    USPC ............................ 370/252; 370/445; 455/63.1
(58) Field of Classification Search
    None
    See application file for complete search history.

(56) References Cited

U.S. PATENT DOCUMENTS

| 7,596,109 | B1 | 9/2009 | Farrington |
| 2002/0136183 | A1* | 9/2002 | Chen et al. ................... 370/338 |
| 2003/0235254 | A1* | 12/2003 | Fanson et al. ................ 375/260 |
| 2006/0188033 | A1 | 8/2006 | Zehavi et al. |
| 2008/0070510 | A1 | 3/2008 | Doppler et al. |
| 2009/0098828 | A1 | 4/2009 | Furman et al. |
| 2009/0247166 | A1 | 10/2009 | Luo et al. |
| 2010/0062705 | A1 | 3/2010 | Rajkotia et al. |
| 2010/0317291 | A1* | 12/2010 | Richardson ................ 455/63.1 |
| 2011/0243010 | A1* | 10/2011 | Geirhofer et al. ............ 370/252 |

FOREIGN PATENT DOCUMENTS

| WO | WO2008064186 A2 | 5/2008 |
| WO | WO2010015971 A1 | 2/2010 |

OTHER PUBLICATIONS

International Search Report and Written Opinion—PCT/US2011/050410—ISA/EPO—Nov. 24, 2011.

* cited by examiner

*Primary Examiner* — Hassan Kizou
*Assistant Examiner* — Roberta A Shand
(74) *Attorney, Agent, or Firm* — James K. O'Hare

(57) ABSTRACT

A method, an apparatus, and a computer program product are provided in which a signal is received on a resource, a signal quality of the signal is determined, a signal energy of the signal is determined, and the resource is jammed based on the signal quality and the signal energy by transmitting a signal on the resource.

40 Claims, 12 Drawing Sheets

METHODS AND APPARATUS TO PERFORM JAMMING BASED ON SIGNAL AND INTERFERENCE IN PEER-TO-PEER NETWORKS

BACKGROUND

1. Field

The present disclosure relates generally to communication systems, and more particularly, to jamming based on signal and interference in peer-to-peer networks.

2. Background

In an ad hoc peer-to-peer wireless network such as Flash-LinQ, peers or nodes need to discover each other's presence. Peer discovery is accomplished by each peer transmitting a peer discovery signal on a resource. A peer's presence is detected by other peers by listening for the peer's peer discovery signal. The resource used for peer discovery is typically a time frequency block. These resources are typically orthogonal, which allow receiving peers to distinguish one from another.

In an ad hoc peer-to-peer network there is no centralized authority to assign the peer discovery resources to peers. As such, two peers in close proximity may transmit their peer discovery signal on the same resource. Transmitting a peer discovery signal on a resource used by another peer to transmit a peer discovery signal can significantly reduce the ability of both the peers to be discovered by other peers. This peer discovery resource conflict may be partially resolved by mechanisms that allow a peer to measure the energy received on the resource used for peer discovery and to reselect the resource on which to transmit a peer discovery signal when the peer determines that the received energy on its own resource is above a certain threshold. However it is possible that two peers that are in close proximity and are transmitting their peer discovery signal on the same resource are not be able to detect each other's energy with sufficient strength on the resource. This inability to detect the energy with sufficient strength could be due to a wall or other barrier between the two peers. As such, the peer discovery resource conflict cannot be resolved through the aforementioned mechanisms. Therefore, there is a need for methods and an apparatus to provide additional mechanisms for peer discovery resource conflict resolution.

SUMMARY

In an aspect of the disclosure, a method, an apparatus, and a computer program product are provided in which a signal is received on a resource, a signal quality of the signal is determined, a signal energy of the signal is determined, and the resource is jammed based on the signal quality and the signal energy by transmitting a signal on the resource.

DETAILED DESCRIPTION

Figure 1:
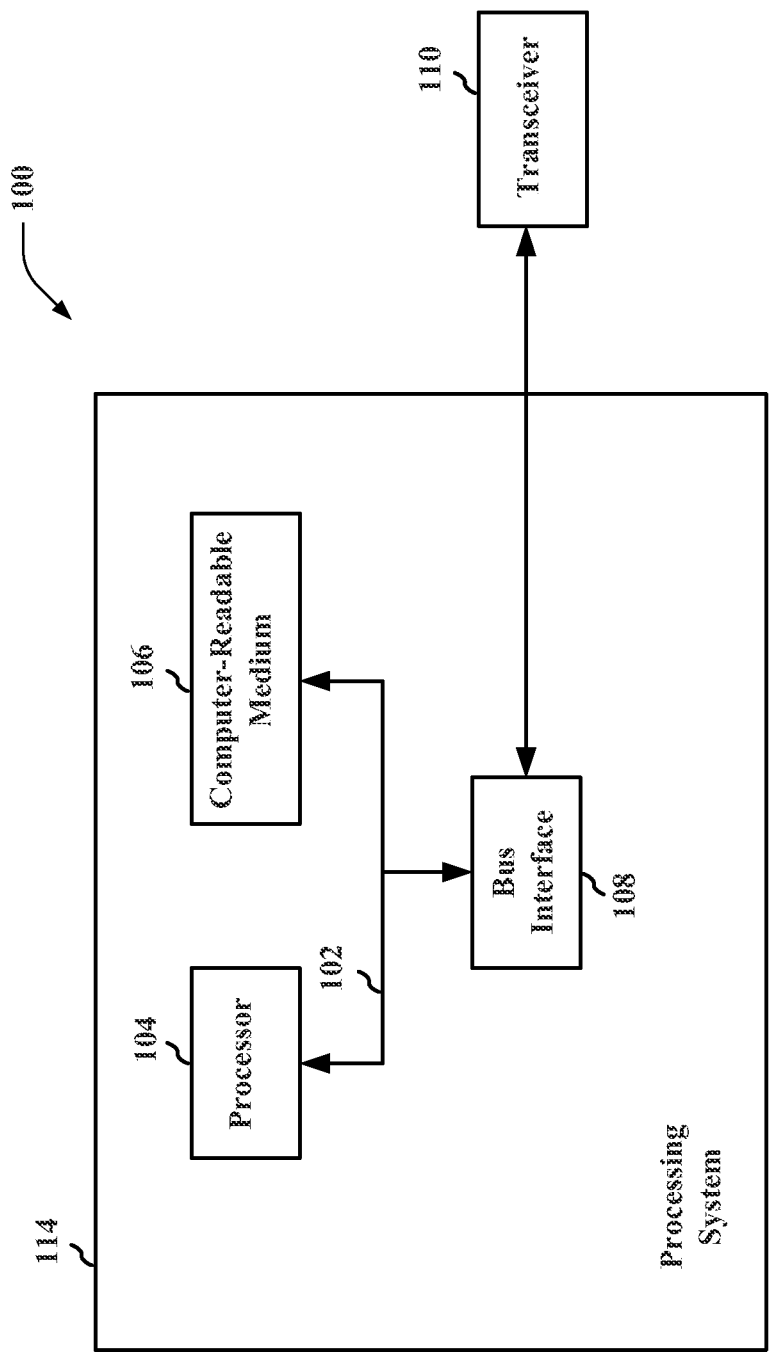
FIG. 1 is a diagram illustrating an example of a hardware implementation for an apparatus employing a processing system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of communication systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

FIG. 1 is a conceptual diagram illustrating an example of a hardware implementation for an apparatus 100 employing a processing system 114. The apparatus 100 may be referred to by those skilled in the art as user equipment, a mobile station, a subscriber station, a mobile unit, a subscriber unit, a wireless unit, a wireless node, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. The processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors, represented generally by the processor 104, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatuses over a transmission medium.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

Figure 2:
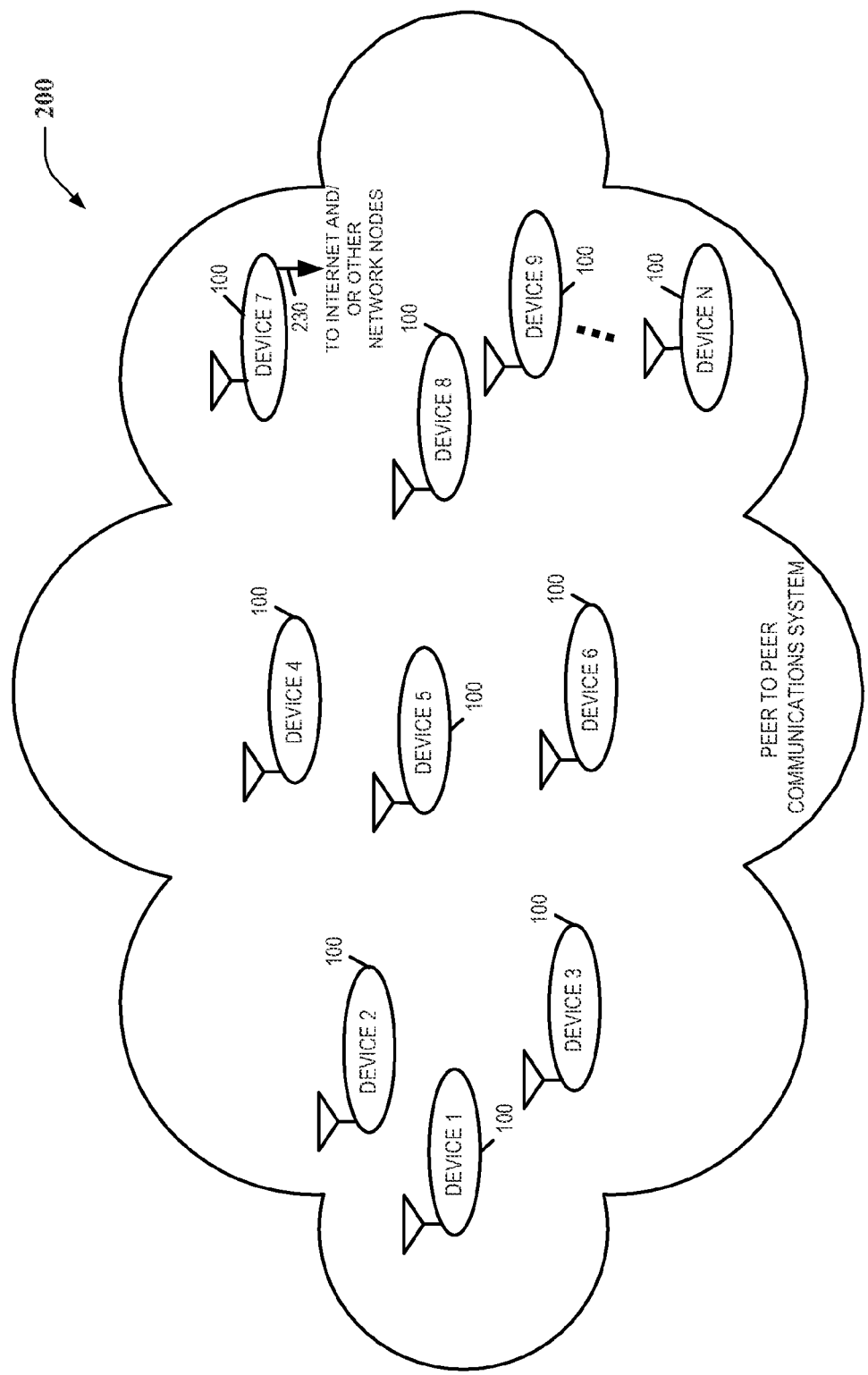
FIG. 2 is a drawing of an exemplary wireless peer-to-peer communications system.

FIG. 2 is a drawing of an exemplary wireless peer-to-peer communications system 200. The wireless peer-to-peer communications system 200 includes a plurality of wireless communications devices 100. Some of the wireless communications devices 100, such as device 7, for example, include an interface 230, to the Internet and/or other network nodes. Some of the wireless communications devices 100 may be mobile wireless communication devices such as handheld mobile devices. The wireless communications devices 100 support direct peer-to-peer communications.

The exemplary methods and apparatuses discussed infra are applicable to any of a variety of wireless peer-to-peer communications systems, such as for example, a wireless peer-to-peer communication system based on FlashLinQ, WiMedia, Bluetooth, ZigBee, or Wi-Fi based on the IEEE 802.11 standard. To simplify the discussion, the exemplary methods and apparatus are discussed within the context of FlashLinQ in relation to FIGS. 3, 4, 5, 6A, and 6B. However, one of ordinary skill in the art would understand that the exemplary methods and apparatuses are applicable more generally to a variety of other wireless peer-to-peer communication systems.

Figure 3:
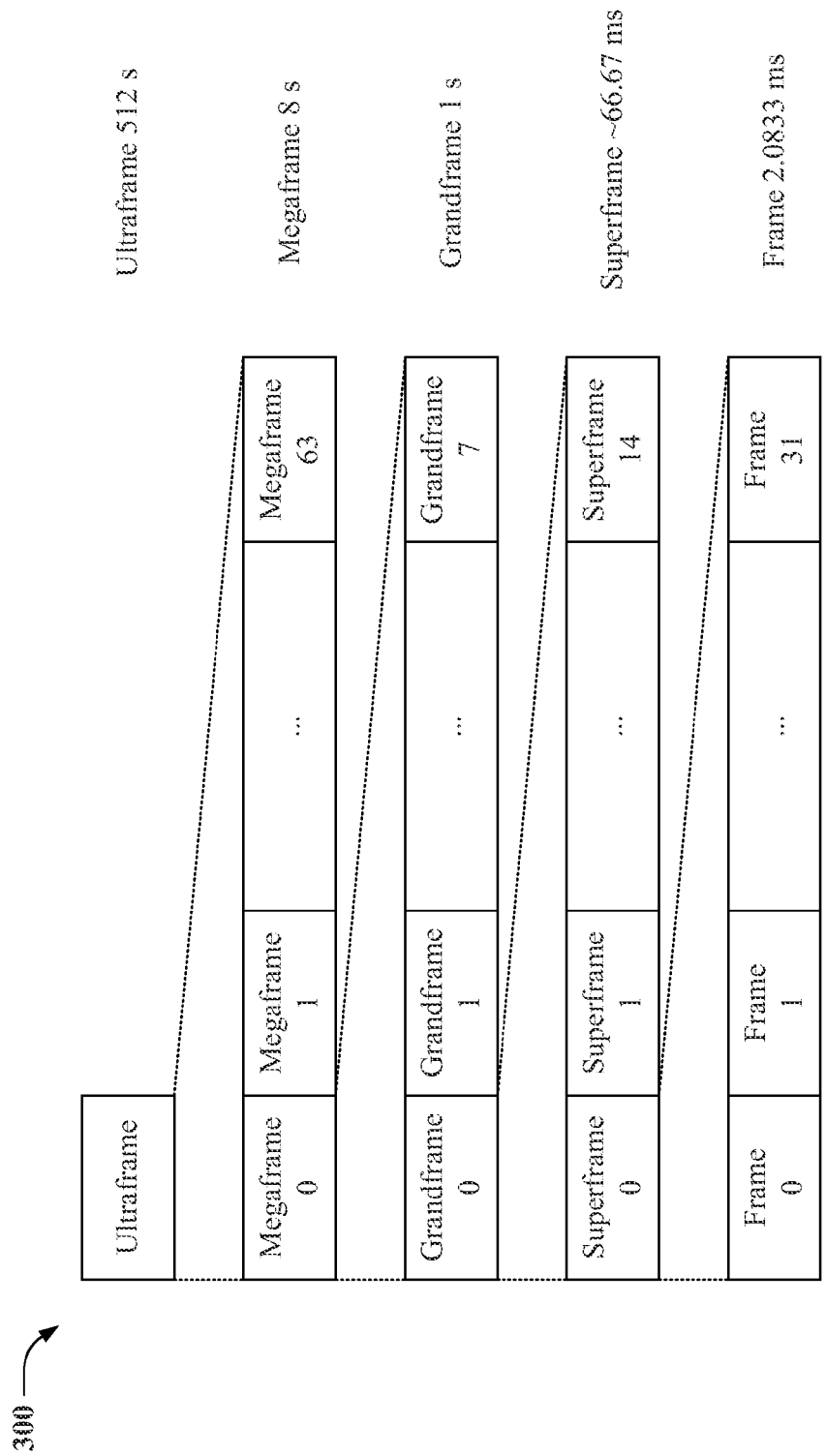
FIG. 3 is a diagram illustrating a time structure for peer-to-peer communication between the wireless communication devices.

FIG. 3 is a diagram 300 illustrating a time structure for peer-to-peer communication between the wireless communication devices 100. An ultraframe is 512 seconds and includes 64 megaframes. Each megaframe is 8 seconds and includes 8 grandframes. Each grandframe is 1 second and includes 15 superframes. Each superframe is approximately 66.67 ms and includes 32 frames. Each frame is 2.0833 ms.

Figure 4:
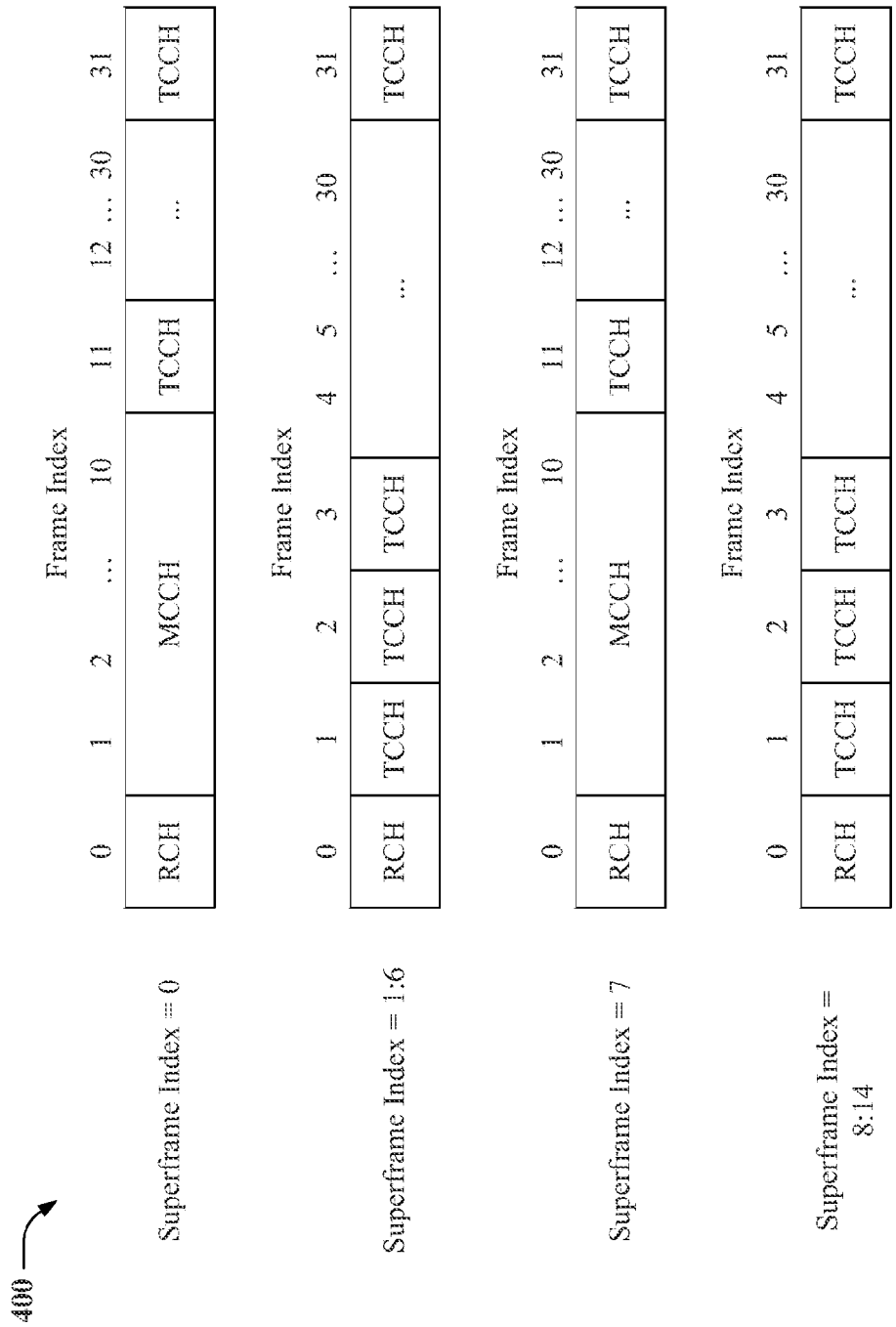
FIG. 4 is a diagram illustrating the channels in each frame of superframes in one grandframe.

FIG. 4 is a diagram 400 illustrating the channels in each frame of superframes in one grandframe. In a first superframe (with index 0), frame 0 is a reserved channel (RCH), frames 1-10 are each a miscellaneous channel (MCCH), and frames 11-31 are each a traffic channel (TCCH). In the $2^{nd}$ through $7^{th}$ superframes (with index 1:6), frame 0 is a RCH and frames 1-31 are each a TCCH. In an $8^{th}$ superframe (with index 7), frame 0 is a RCH, frames 1-10 are each a MCCH, and frames 11-31 are each a TCCH. In the $9^{th}$ through $15^{th}$ superframes (with index 8:14), frame 0 is a RCH and frames 1-31 are each a TCCH. The MCCH of superframe index 0 includes a secondary timing synchronization channel, a peer discovery channel, a peer page channel, and a reserved slot. The MCCH of superframe index 7 includes a peer page channel and reserved slots. The TCCH includes connection scheduling, a pilot, channel quality indicator (CQI) feedback, a data segment, and an acknowledgement (ACK).

Figure 5:
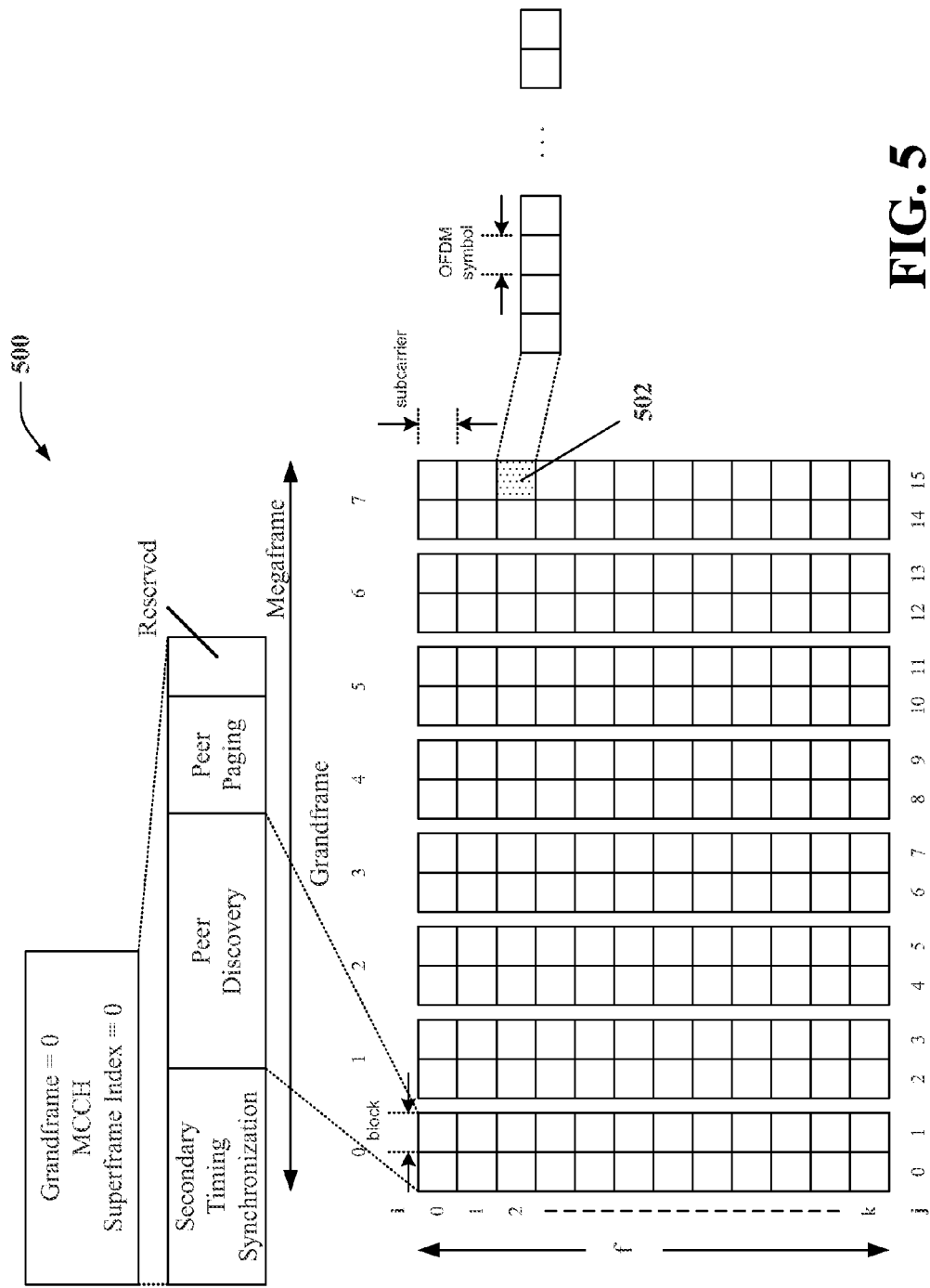
FIG. 5 is a diagram illustrating an operation timeline of a miscellaneous channel and an exemplary structure of a peer discovery channel.

FIG. 5 is a diagram 500 illustrating an operation timeline of the MCCH and an exemplary structure of a peer discovery channel. As discussed in relation to FIG. 4, the MCCH of superframe index 0 includes a secondary timing synchronization channel, a peer discovery channel, a peer paging channel, and a reserved slot. The peer discovery channel may be divided into subchannels. For example, the peer discovery channel may be divided into a long range peer discovery channel, a medium range peer discovery channel, a short range peer discovery channel, and other channels. Each of the subchannels may include a plurality of blocks/resources for communicating peer discovery information. Each block may include a plurality of orthogonal frequency divisional multiplexing (OFDM) symbols at the same subcarrier. FIG. 5 provides an example of a subchannel (e.g., short range peer discovery channel) including blocks in one megaframe, which includes the MCCH superframe index 0 of grandframes 0 through 7. Different sets of blocks correspond to different peer discovery resource identifiers (PDRIDs). For example, one PDRID may correspond to one of the blocks in the MCCH superframe index 0 of one grandframe in the megaframe.

Upon power up, a wireless device listens to the peer discovery channel for a period of time (e.g., two megaframes) and selects a PDRID based on a determined energy on each of the PDRIDs. For example, a wireless device may select a PDRID corresponding to block 502 (i=2 and j=15) in a first megaframe of an ultraframe. The particular PDRID may map to other blocks in other megaframes of the ultraframe due to hopping. The wireless device may also reselect a PDRID if the wireless device detects a PDRID collision. That is, a wireless device may listen rather than transmit on its available peer discovery resource in order to detect an energy on the peer discovery resource corresponding to its PDRID. The wireless device may also detect energies on other peer discovery resources corresponding to other PDRIDs. The wireless device may reselect a PDRID if the determined energy on the peer discovery resource corresponding to its PDRID is sufficiently higher than the detected energies on the other peer discovery resources corresponding to other PDRIDs.

Figure 6:
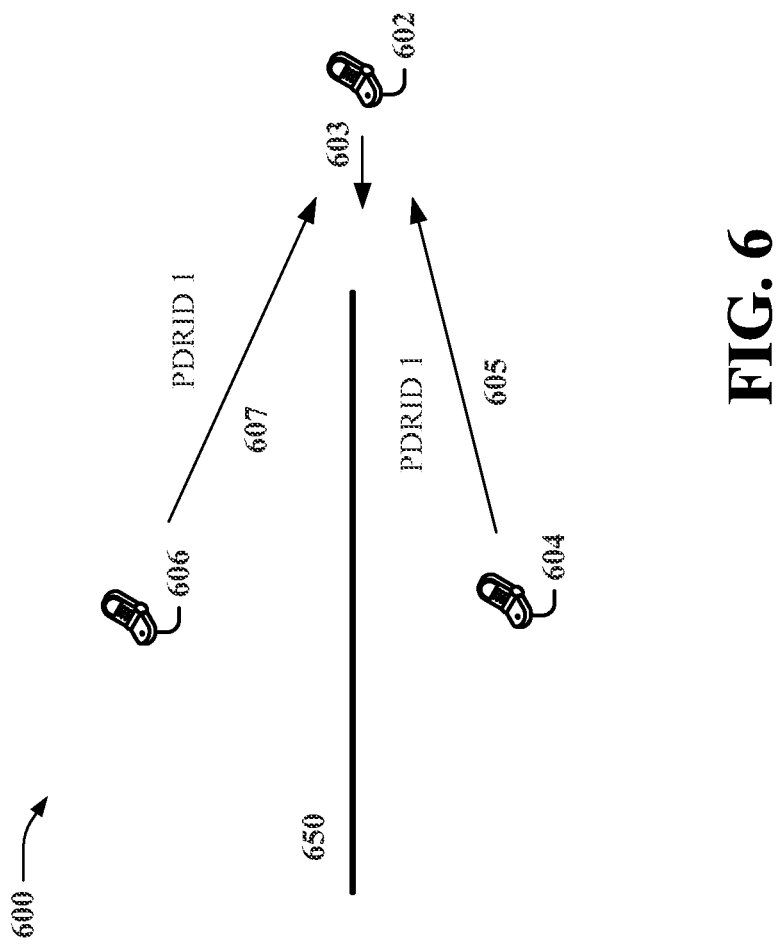
FIG. 6 is a diagram illustrating an exemplary method of performing jamming based on signal and interference in peer-to-peer networks.

FIG. 6 is a diagram 600 illustrating an exemplary method of performing jamming based on signal and interference in peer-to-peer networks. As shown in FIG. 6, the wireless node 604 is transmitting a peer discovery signal 605 on resources corresponding to PDRID 1 and the wireless node 606, which is also utilizing PDRID 1, is transmitting a peer discovery signal 607 on the same resource. A wall or other barrier 650 prevents the wireless node 604 from being able to detect the energy of the peer discovery signal 607 with sufficient strength and prevents the wireless node 606 from being able to detect the energy of the peer discovery signal 605 with sufficient strength. As such, the wireless nodes 604, 606 are unable to detect a PDRID collision and therefore the wireless nodes 604, 606 do not reselect their PDRIDs based on the detection of the other wireless node utilizing its PDRID. As discussed supra, such a situation is called the hidden node problem, as the wireless node 606 is effectively hidden from the wireless node 604 and is undetectable by the wireless node 604, and the wireless node 604 is effectively hidden from the wireless node 606 and is undetectable by the wireless node 606. As such, neither of the wireless nodes will reselect their PDRIDs based on the energy detection of the other.

Solving the hidden node problem requires a wireless node 602 that is able to detect energy with sufficient strength from both the wireless nodes 604, 606. Solving the hidden node problem also requires that at least one of the wireless node 604 or the wireless node 606 is able to detect the energy received from (i.e., transmitted by) the wireless node 602 with sufficient strength. The wireless node 602 detects that the wireless nodes 604, 606 are somewhat close and are transmitting on the same resource (i.e., utilizing the same PDRID) and responds by transmitting its own signal 603 on the same resource in order to jam peer discovery signals sent on the resource. This jamming of peer discovery signals will force at least one of the wireless node 604 or the wireless node 606 to reselect the resource on which the peer discovery signal is transmitted.

Figure 7:
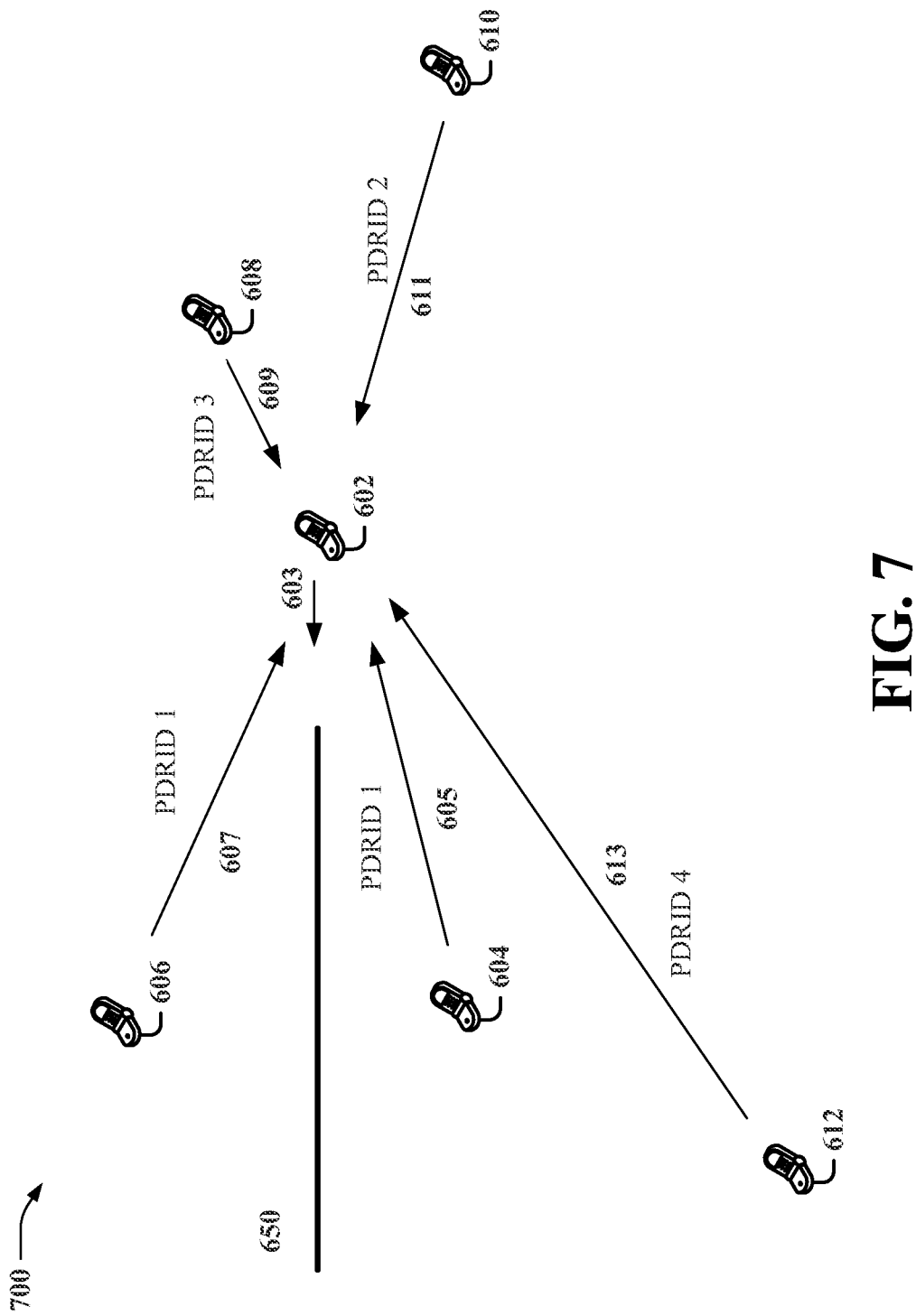
FIG. 7 is another diagram illustrating the exemplary method of performing jamming based on signal and interference in peer-to-peer networks.

FIG. 7 is a diagram 700 illustrating the exemplary method of performing jamming based on signal and interference in peer-to-peer networks. The wireless node 602 receives a signal on a resource as discussed in relation to FIG. 5 and FIG. 6. The signal includes the peer discovery signal 607 and the peer discovery signal 605. The wireless node 602 determines a signal energy of the received signal. The signal energy may include the energy of peer discovery signal 605, the energy of peer discovery signal 607, and any other signal received using the resources of PDRID 1. Alternatively, the signal energy may only include the received energy of the peer discovery signal 605. The signal energy may be derived from only a portion of the peer discovery resources for the PDRID. That is, for a particular resource, the energy may be determined of a subset of the resource rather than the entire resource. For example, if a particular resource corresponds to one block (see FIG. 5), an energy may be determined for a subset of the OFDM symbols in the block.

For this example, assume the peer discovery signal 605 is stronger than the peer discovery signal 607. The wireless node 602 then determines a signal quality of the peer discovery signal 605. The signal quality of the peer discovery signal 605 is low, as the peer discovery signal 607 is causing interference. The wireless node 602 then decides to jam the resource based on the signal quality and the signal energy by transmitting a signal 603 on the resource.

The signal 603 may be a peer discovery signal identical to the peer discovery signal 605 or may be a jamming signal with a specific structure or pattern such that it may be recognized as a jamming signal by other wireless devices even at a low signal to interference plus noise ratio (SINR). The jamming signal would carry no peer discovery information, but could be easily detected even when the SINR is low. The jamming signal may be a spreading code with a known sequence or may be transmitted in a subset of the resource with a particular pattern in frequency or time that may be detected by other wireless nodes.

The wireless node 602 may determine to jam the resource when the signal quality of the peer discovery signal 605 is below a first threshold and the signal energy is above a second threshold for a listening period. A high signal energy and low signal quality of the peer discovery signal 605 indicates to the wireless node 602 that the wireless node 604 is close, but that there is another wireless node 606 that is also close and is causing interference to degrade the quality of the peer discovery signal 605. Before jamming, the wireless node may listen for a listening period to ascertain whether the wireless nodes 604, 606 reselect/reshuffle to another PDRID. That is, the wireless node 602 may jam only when the signal quality is below a first threshold and the signal energy is above a second threshold for a listening period longer than the reshuffling period for reselecting a PDRID, as reselection may resolve the PDRID conflict. When the signal 603 is a peer discovery signal rather than a jamming signal, the wireless node 602 jams for a jamming period that is less than the listening period. If the jamming period is greater than the listening period, another wireless node such as the wireless node 608 may incorrectly decide to jam based on the signal 603 rather than the peer discovery signals 605, 607.

Rather than determine whether to jam based on thresholds, the wireless node 602 may determine whether to jam based on a comparison with other received peer discovery signals. As shown in FIG. 7, the wireless node 602 receives a peer discovery signal 609 on resources corresponding to PDRID 3 from the wireless node 608, a peer discovery signal 611 on resources corresponding to PDRID 2 from the wireless node 610, and a peer discovery signal 613 on resources corresponding to PDRID 4 from the wireless node 612. The wireless node 602 determines a signal quality and signal energy of one of the peer discovery signals. For example, the wireless node may determine the signal quality and signal energy of the peer discovery signal 613. The wireless node 602 may then compare the signal quality of the peer discovery signal 613 to the signal quality of the peer discovery signal 605 and the signal energy of the peer discovery signal 613 to the signal energy of the peer discovery signals 605, 607 and jam based on the comparison. For example, if the signal energy of the peer discovery signals 605, 607 is higher than the signal energy of the peer discovery signal 613, but the peer discovery signal 605 does not have a higher signal quality than the peer discovery signal 613 or a comparable increase in signal quality as compared to the signal quality of the peer discovery signal 613, the wireless node 602 may determine that there is a PDRID conflict and therefore to jam the resource corresponding to the PDRID.

Figure 8:
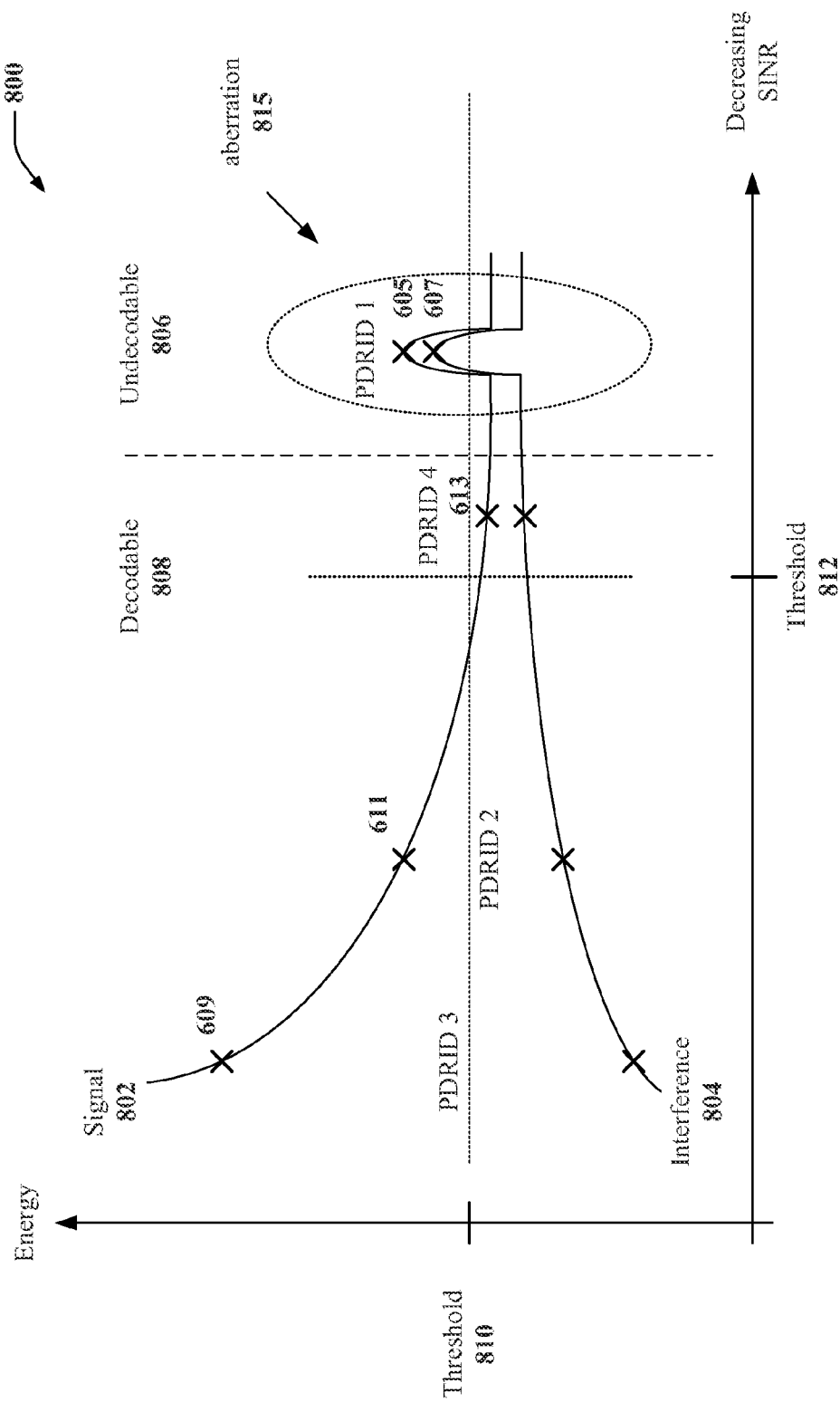
FIG. 8 is yet another diagram illustrating the exemplary method of performing jamming based on signal and inference in peer-to-peer networks.

FIG. 8 is a diagram 800 illustrating the exemplary method of performing jamming based on signal and inference in peer-to-peer networks. The diagram 800 is a plot of the energy versus decreasing signal to inference plus noise ratio (SINR) of the peer discovery signals 802 and interference 804 to those peer discovery signals 802. In FIG. 8, the signal energy refers to the received energy of the peer discovery signal on the PDRID only and does not include any other component of the received energy. As shown in the diagram 800, the peer discovery signal 605 and the interfering peer discovery signal 607 are on resources corresponding to PDRID 1, the peer discovery signal 613 is on resources corresponding to PDRID 4, the peer discovery signal 611 is on resources corresponding to PDRID 2, and the peer discovery signal 609 is on resources corresponding to PDRID 3. The peer discovery signal 609 has the highest signal energy and the highest signal quality, as the interference is low. The peer discovery signal 611 and the peer discovery signal 605 have the next highest signal energy, but the signal quality of the peer discovery signal 611 is higher than the signal quality of the peer discovery signal 605, as the peer discovery signal 607 is causing significant interference with the peer discovery signal 605. The peer discovery signal 613 has the lowest signal energy and a low signal quality.

As described supra, the wireless node 602 may determine to jam when the signal quality of the peer discovery signal 605 is below a first threshold 812 and the signal energy of the peer discovery signals 605, 607 is above a second threshold 810. The signal quality may be an SINR or may be based on whether the signal is decodable 808 or undecodable 806. As such, in one configuration, the wireless node 602 jams only when the peer discovery signal is undecodable. In another configuration, the wireless node 602 jams even if the peer discovery signal is decodable, but only if the SINR of the peer discovery signal is below the threshold 812. The threshold 812 may be adjusted such that the threshold 812 approximately delineates the undecodable 806 and decodable 808 regions. The signal may include a plurality of signals and the signal energy may be derived based on an energy of one or more of the plurality of signals on the resource. The signal energy may be a partial signal energy derived based on an energy on a subset of OFDM symbols of the resource.

Furthermore, as described supra, the wireless node 602 may receive the peer discovery signal 613, determine a signal quality and signal energy of the peer discovery signal 613, and through a comparison of the signal energy and signal quality of the peer discovery signal 613 to the signal energy and signal quality of the peer discovery signal 605, determine an aberration 815 as shown in the diagram 800 indicating a PDRID conflict, and therefore jam the resource corresponding to the PDRID 1.

Figure 9:
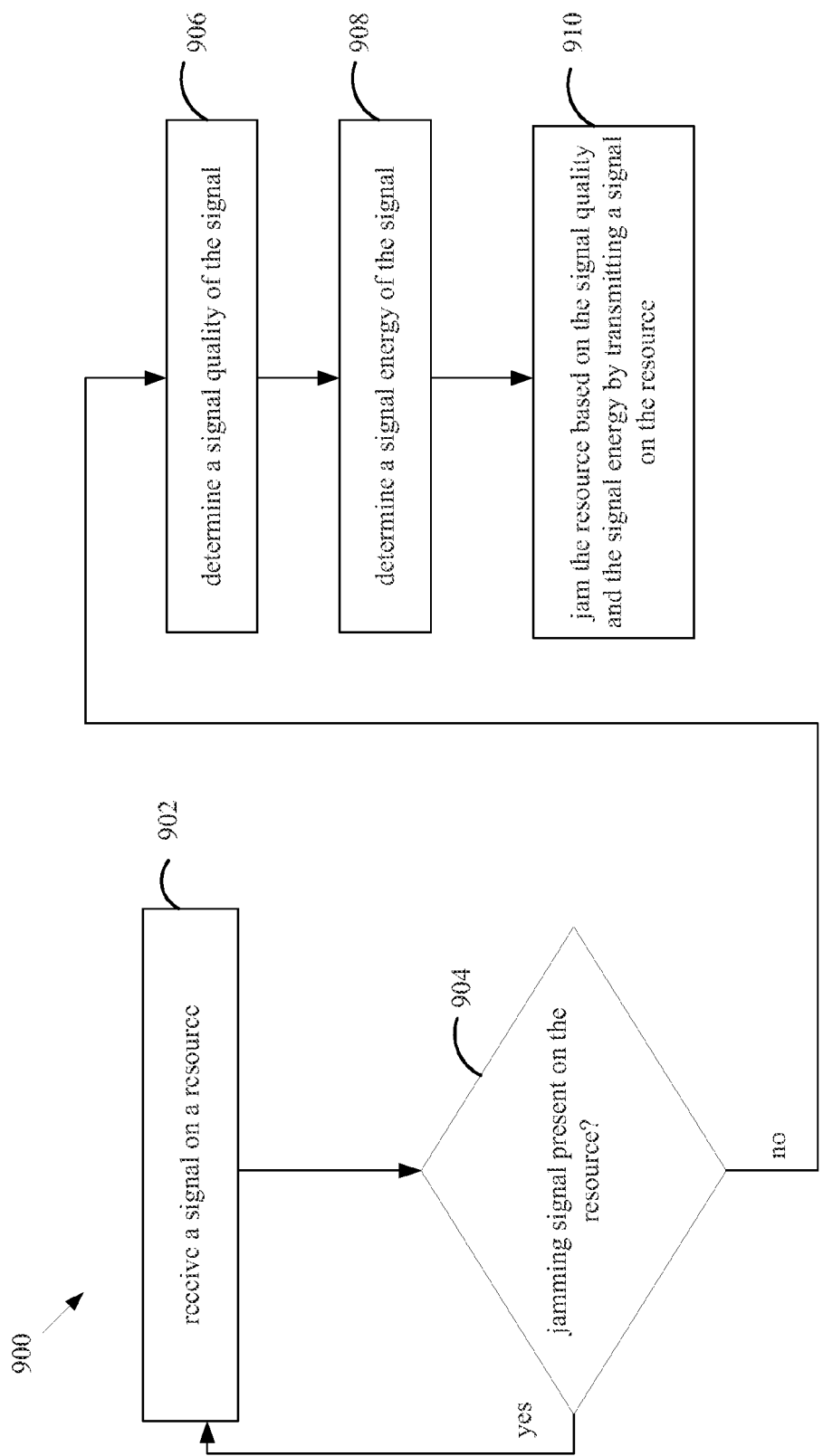
FIG. 9 is a flow chart of an exemplary method of a wireless node.

FIG. 9 is a flow chart 900 of an exemplary method performed by a wireless node. The wireless node receives a signal on a resource (902). The signal may include multiple signals received using the same resource. The wireless node determines whether another wireless node is jamming the resource (904). If another wireless node is not jamming the resource, the wireless node determines a signal quality of the signal (906) and a signal energy of the signal (908). The wireless node jams the resource based on the signal quality and the signal energy by transmitting a signal on the resource (910). The signal may be a peer discovery signal.

Figure 10:
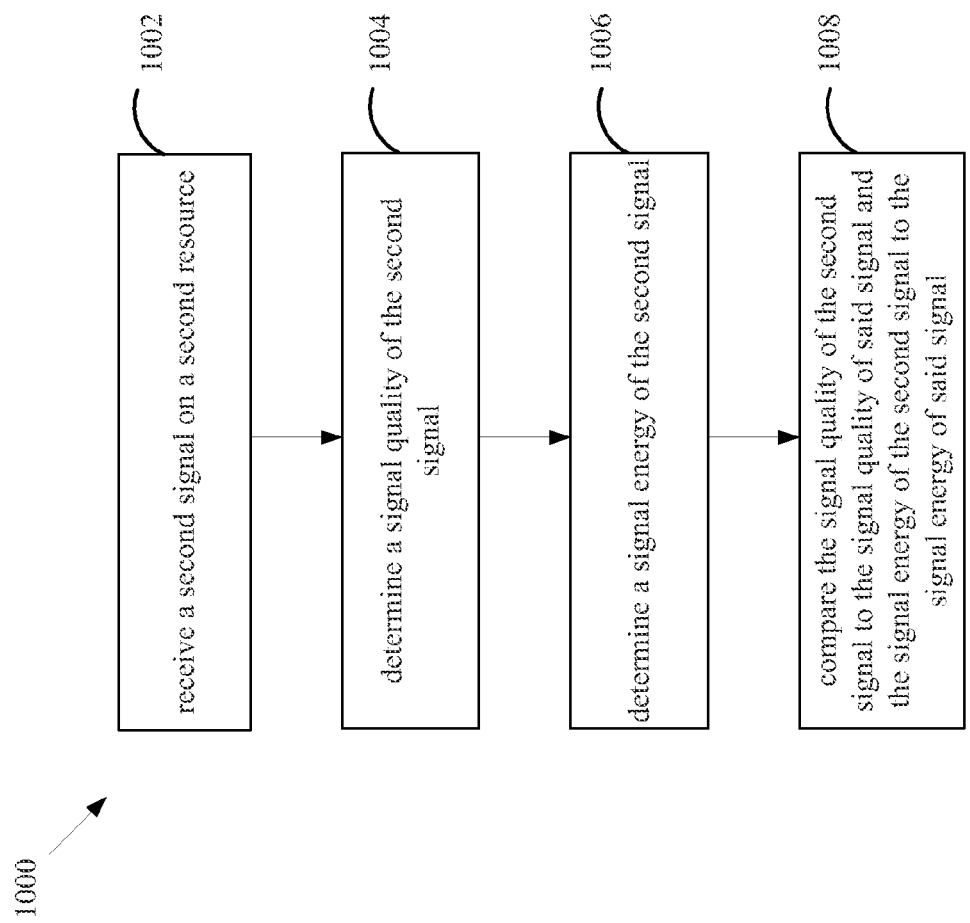
FIG. 10 is a flow chart of another exemplary method of a wireless node.

FIG. 10 is a flow chart 1000 of an exemplary method performed by a wireless node. In addition to the steps of FIG. 9, the wireless node may receive a second signal on a second resource (1002), determine a signal quality of the second signal (1004), determine a signal energy of the second signal (1006), and compare the signal quality of the second signal to the signal quality of said signal and the signal energy of the second signal to the signal energy of said signal (1008). The wireless node may then jam based on the comparison. As described supra, through the comparison, the wireless node may be able to determine an aberration 815 (see FIG. 8) if a higher signal energy is not coupled with a comparable increase in signal quality as compared to a signal energy and signal quality of another received signal.

Figure 11:
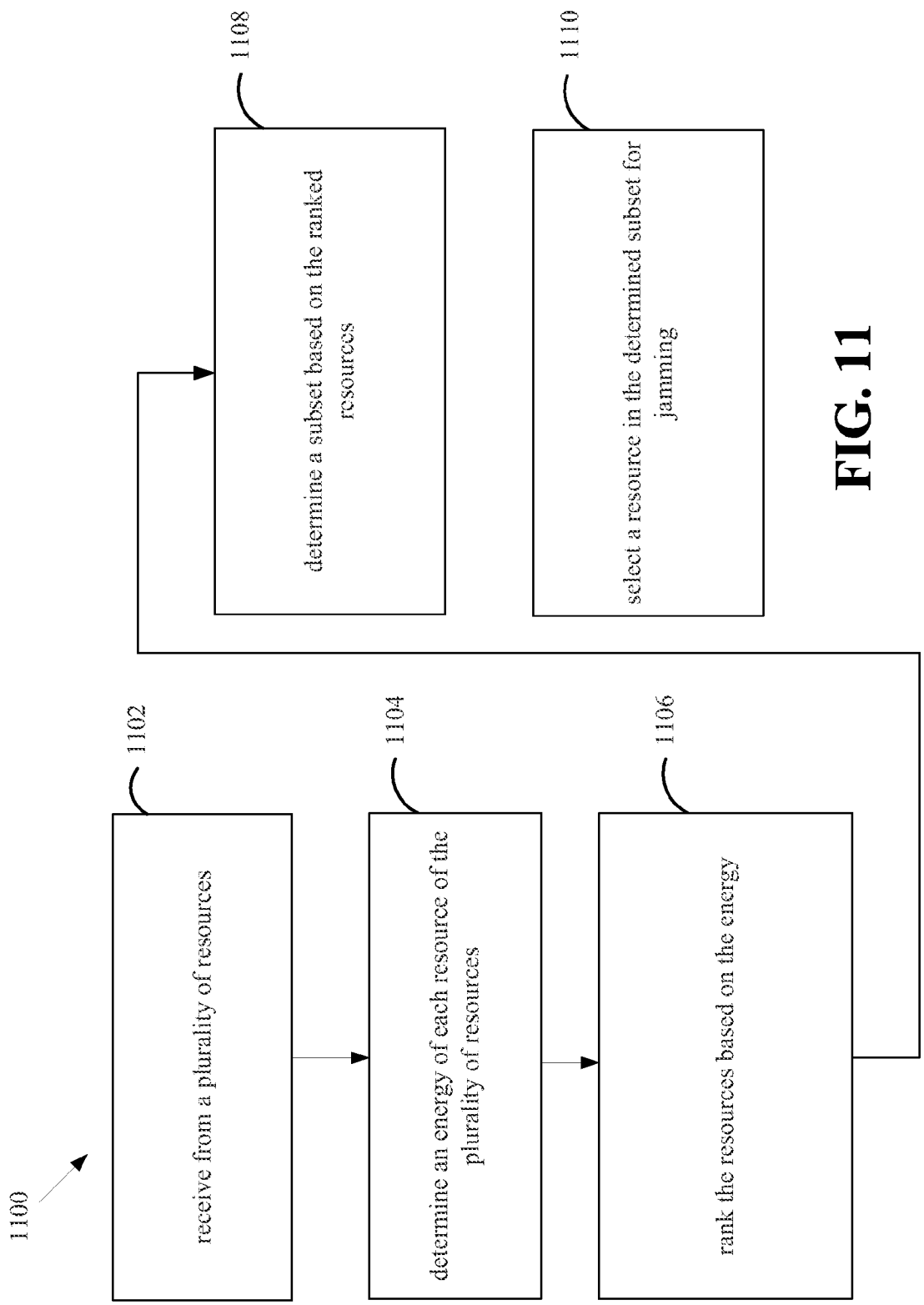
FIG. 11 is a flow chart of yet another exemplary method of a wireless node.

FIG. 11 is a flow chart 1100 of an exemplary method performed by a wireless node. In addition to the steps of FIG. 9, the wireless node may receive signals on a plurality of resources (1102) and determine an energy on each resource of the plurality of resources (1104). For those resources that have a signal energy above the threshold 810 and on which the signals are undecodable or have a signal quality below the threshold 812, the wireless node may rank the resources based on the signal energy (1106). From the ranked resources, the wireless node may then determine a subset based on the ranked resources (1108). For example, the wireless node may select a subset of the top x % of the ranked resources based on the signal energy, thus selecting for the subset the x % of ranked resources closest to the wireless node with the highest signal energy. From the subset, the wireless node may then select a resource in the determined subset for jamming (1110).

Figure 12:
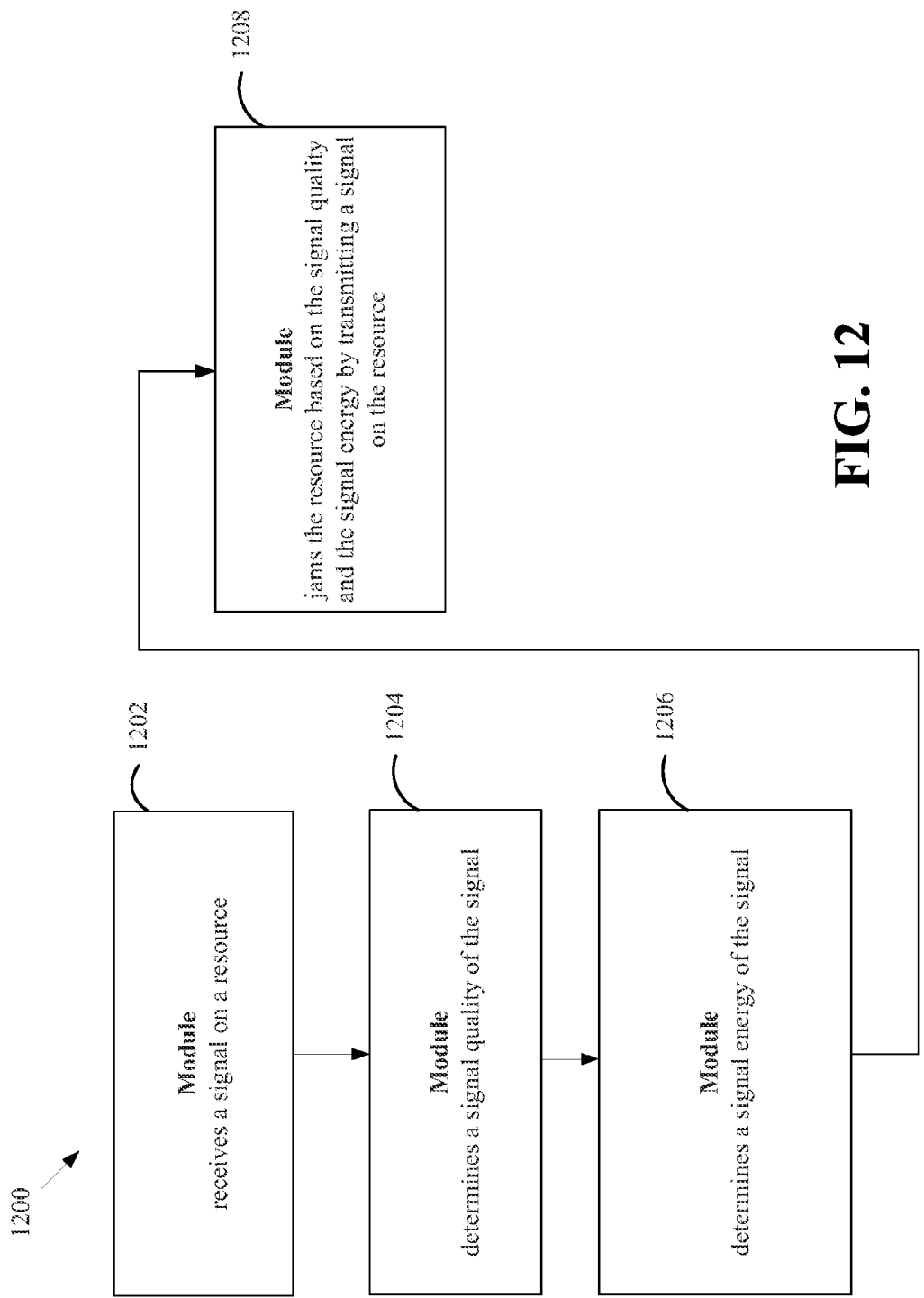
FIG. 12 is a conceptual block diagram illustrating the functionality of an exemplary apparatus.

FIG. 12 is a conceptual block diagram 1200 illustrating the functionality of an exemplary apparatus 100. The apparatus 100 includes a module 1202 that receives a signal on a resource. The signal may include multiple signals received on the same resource. The apparatus 100 further includes a module 1204 that determines a signal quality of the signal, a module 1206 that determines a signal energy of the signal, and a module 1208 that jams the resource based on the signal quality and the signal energy by transmitting a signal on the resource.

Referring to FIG. 1, in one configuration, the apparatus 100 for wireless communication includes means for receiving a signal on a resource, means for determining a signal quality of the signal, means for determining a signal energy of the signal, and means for jamming the resource based on the signal quality and the signal energy by transmitting a signal on the resource. In one configuration, the apparatus 100 further includes means for receiving a second signal on a second resource, means for determining a signal quality of the second signal, means for determining a signal energy of the second signal, and means for comparing the signal quality of the second signal to the signal quality of said signal and the signal energy of the second signal to the signal energy of said signal. The means for jamming jams based on the comparison. In another configuration, the apparatus 100 further includes means for receiving signals on a plurality of resources, means for determining an energy on each resource of the plurality of resources, means for ranking the resources based on the energy, means for determining a subset based on the ranked resources, and means for selecting a resource in the determined subset for jamming. In yet another configuration, the apparatus 100 further includes means for determining if a jamming signal is present on the resource before performing the jamming. The aforementioned means is the processing system 114 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communication, comprising:
receiving a signal on a resource;
determining a signal quality of the signal;
determining a signal energy of the signal; and
jamming the resource based on the signal quality and the signal energy by transmitting a signal on the resource;
wherein the signal includes a plurality of signals and the signal energy is derived based on an energy of one or more of the plurality of signals on the resource, and the signal energy is a partial signal energy derived based on an energy on a subset of orthogonal frequency division multiplexing (OFDM) symbols of the resource.

2. A method of wireless communication, comprising:
receiving a signal on a resource;
determining a signal quality of the signal;
determining a signal energy of the signal;
jamming the resource based on the signal quality and the signal energy by transmitting a signal on the resource;
receiving signals on a plurality of resources;
determining an energy on each resource of the plurality of resources;
ranking the resources based on the energy;
determining a subset based on the ranked resources; and
selecting a resource in the determined subset for jamming.

3. A method of wireless communication, comprising:
receiving a signal on a resource;
determining a signal quality of the signal;
determining a signal energy of the signal; and
jamming the resource based on the signal quality and the signal energy by transmitting a signal on the resource;
wherein the transmitted signal is a jamming signal that can be detected at a low signal to interference plus noise ratio (SINR).

4. A method of wireless communication, comprising:
receiving a signal on a resource;
determining a signal quality of the signal;
determining a signal energy of the signal;
jamming the resource based on the signal quality and the signal energy by transmitting a signal on the resource; and
determining if a jamming signal is present on the resource before performing the jamming.

5. A method of wireless communication, comprising:
receiving a signal on a resource;
determining a signal quality of the signal;
determining a signal energy of the signal; and
jamming the resource based on the signal quality and the signal energy by transmitting a signal on the resource;
wherein the jamming is performed when the signal quality is below a first threshold and the signal energy is above a second threshold for a period of time.

6. The method of claim 5, wherein the signal is a peer discovery signal.

7. The method of claim 5, further comprising:
receiving a second signal on a second resource;
determining a signal quality of the second signal;
determining a signal energy of the second signal; and
comparing the signal quality of the second signal to the signal quality of said signal and the signal energy of the second signal to the signal energy of said signal,
wherein the jamming is based on the comparison.

8. The method of claim 5, wherein the signal quality is one of a signal to interference plus noise ratio (SINR) or based on whether the signal is decodable.

9. The method of claim 5, wherein the signal includes a plurality of signals and the signal energy is derived based on an energy of one or more of the plurality of signals on the resource.

10. The method of claim 5, wherein the jamming is performed less than said period of time.

11. An apparatus for wireless communication, comprising:
a processing system configured to:
receive a signal on a resource;
determine a signal quality of the signal;
determine a signal energy of the signal; and
jam the resource based on the signal quality and the signal energy by transmitting a signal on the resource;
wherein the signal includes a plurality of signals and the signal energy is derived based on an energy of one or more of the plurality of signals on the resource and the signal energy is a partial signal energy derived based on an energy on a subset of orthogonal frequency division multiplexing (OFDM) symbols of the resource.

12. An apparatus for wireless communication, comprising:
a processing system configured to:
receive a signal on a resource;
determine a signal quality of the signal;
determine a signal energy of the signal;
jam the resource based on the signal quality and the signal energy by transmitting a signal on the resource;
receive signals on a plurality of resources;
determine an energy on each resource of the plurality of resources;
rank the resources based on the energy;
determine a subset based on the ranked resources; and
select a resource in the determined subset for jamming.

13. An apparatus for wireless communication, comprising:
a processing system configured to:
receive a signal on a resource;
determine a signal quality of the signal;
determine a signal energy of the signal; and
jam the resource based on the signal quality and the signal energy by transmitting a signal on the resource;
wherein the transmitted signal is a jamming signal that can be detected at a low signal to interference plus noise ratio (SINR).

14. An apparatus for wireless communication, comprising:
a processing system configured to:
receive a signal on a resource;
determine a signal quality of the signal;
determine a signal energy of the signal; and
jam the resource based on the signal quality and the signal energy by transmitting a signal on the resource;
wherein the processing system is further configured to determine if a jamming signal is present on the resource before performing the jamming.

15. An apparatus for wireless communication, comprising:
a processing system configured to:
receive a signal on a resource;
determine a signal quality of the signal;
determine a signal energy of the signal; and
jam the resource based on the signal quality and the signal energy by transmitting a signal on the resource;
wherein the processing system is configured to jam when the signal quality is below a first threshold and the signal energy is above a second threshold for a period of time.

16. The apparatus of claim 15, wherein the signal is a peer discovery signal.

17. The apparatus of claim 15, wherein the processing system is further configured to:
receive a second signal on a second resource;
determine a signal quality of the second signal;
determine a signal energy of the second signal; and
compare the signal quality of the second signal to the signal quality of said signal and the signal energy of the second signal to the signal energy of said signal,
wherein the processing system is configured to jam based on the comparison.

18. The apparatus of claim 15, wherein the signal quality is one of a signal to interference plus noise ratio (SINR) or based on whether the signal is decodable.

19. The apparatus of claim 15, wherein the signal includes a plurality of signals and the signal energy is derived based on an energy of one or more of the plurality of signals on the resource.

20. The apparatus of claim 15, wherein the processing system is configured to jam less than said period of time.

21. An apparatus for wireless communication, comprising:
means for receiving a signal on a resource;
means for determining a signal quality of the signal;
means for determining a signal energy of the signal; and
means for jamming the resource based on the signal quality and the signal energy by transmitting a signal on the resource;
wherein the signal includes a plurality of signals and the signal energy is derived based on an energy of one or more of the plurality of signals on the resource and the signal energy is a partial signal energy derived based on an energy on a subset of orthogonal frequency division multiplexing (OFDM) symbols of the resource.

22. An apparatus for wireless communication, comprising:
means for receiving a signal on a resource;
means for determining a signal quality of the signal;
means for determining a signal energy of the signal;
means for jamming the resource based on the signal quality and the signal energy by transmitting a signal on the resource;
means for receiving signals on a plurality of resources;
means for determining an energy on each resource of the plurality of resources;
means for ranking the resources based on the energy;
means for determining a subset based on the ranked resources; and
means for selecting a resource in the determined subset for jamming.

23. An apparatus for wireless communication, comprising:
means for receiving a signal on a resource;
means for determining a signal quality of the signal;
means for determining a signal energy of the signal; and
means for jamming the resource based on the signal quality and the signal energy by transmitting a signal on the resource;
wherein the transmitted signal is a jamming signal that can be detected at a low signal to interference plus noise ratio (SINR).

24. An apparatus for wireless communication, comprising:
means for receiving a signal on a resource;
means for determining a signal quality of the signal;
means for determining a signal energy of the signal;
means for jamming the resource based on the signal quality and the signal energy by transmitting a signal on the resource; and
means for determining if a jamming signal is present on the resource before performing the jamming.

25. An apparatus for wireless communication, comprising:
means for receiving a signal on a resource;
means for determining a signal quality of the signal;
means for determining a signal energy of the signal; and
means for jamming the resource based on the signal quality and the signal energy by transmitting a signal on the resource;
wherein the means for jamming jams when the signal quality is below a first threshold and the signal energy is above a second threshold for a period of time.

26. The apparatus of claim 25, wherein the signal is a peer discovery signal.

27. The apparatus of claim 25, further comprising:
means for receiving a second signal on a second resource;
means for determining a signal quality of the second signal;
means for determining a signal energy of the second signal; and
means for comparing the signal quality of the second signal to the signal quality of said signal and the signal energy of the second signal to the signal energy of said signal,
wherein the means for jamming jams based on the comparison.

28. The apparatus of claim 25, wherein the signal quality is one of a signal to interference plus noise ratio (SINR) or based on whether the signal is decodable.

29. The apparatus of claim 25, wherein the signal includes a plurality of signals and the signal energy is derived based on an energy of one or more of the plurality of signals on the resource.

30. The apparatus of claim 25, wherein the means for jamming jams less than said period of time.

31. A computer program product in a wireless device, comprising:
a non-transitory computer-readable medium comprising code for:
receiving a signal on a resource;
determining a signal quality of the signal;
determining a signal energy of the signal; and
jamming the resource based on the signal quality and the signal energy by transmitting a signal on the resource;
wherein the signal includes a plurality of signals and the signal energy is derived based on an energy of one or more of the plurality of signals on the resource and the signal energy is a partial signal energy derived based on an energy on a subset of orthogonal frequency division multiplexing (OFDM) symbols of the resource.

32. A computer program product in a wireless device, comprising:
a non-transitory computer-readable medium comprising code for:
receiving a signal on a resource;
determining a signal quality of the signal;
determining a signal energy of the signal;
jamming the resource based on the signal quality and the signal energy by transmitting a signal on the resource;
receiving signals on a plurality of resources;
determining an energy on each resource of the plurality of resources;
ranking the resources based on the energy;
determining a subset based on the ranked resources; and
selecting a resource in the determined subset for jamming.

33. A computer program product in a wireless device, comprising:
a non-transitory computer-readable medium comprising code for:
receiving a signal on a resource;
determining a signal quality of the signal;
determining a signal energy of the signal; and
jamming the resource based on the signal quality and the signal energy by transmitting a signal on the resource;
wherein the transmitted signal is a jamming signal that can be detected at a low signal to interference plus noise ratio (SINR).

34. A computer program product in a wireless device, comprising:
a non-transitory computer-readable medium comprising code for:
receiving a signal on a resource;
determining a signal quality of the signal;
determining a signal energy of the signal; and
jamming the resource based on the signal quality and the signal energy by transmitting a signal on the resource;
wherein the computer-readable medium further comprises code for determining if a jamming signal is present on the resource before performing the jamming.

35. A computer program product in a wireless device, comprising:
a non-transitory computer-readable medium comprising code for:
receiving a signal on a resource;
determining a signal quality of the signal;
determining a signal energy of the signal; and
jamming the resource based on the signal quality and the signal energy by transmitting a signal on the resource;
wherein the code for jamming jams when the signal quality is below a first threshold and the signal energy is above a second threshold for a period of time.

36. The computer program product of claim 35, wherein the signal is a peer discovery signal.

37. The computer program product of claim 35, wherein the computer-readable medium further comprises code for:
receiving a second signal on a second resource;
determining a signal quality of the second signal;
determining a signal energy of the second signal; and
comparing the signal quality of the second signal to the signal quality of said signal and the signal energy of the second signal to the signal energy of said signal,
wherein the code for jamming jams based on the comparison.

38. The computer program product of claim 35, wherein the signal quality is one of a signal to interference plus noise ratio (SINR) or based on whether the signal is decodable.

39. The computer program product of claim 35, wherein the signal includes a plurality of signals and the signal energy is derived based on an energy of one or more of the plurality of signals on the resource.

40. The computer program product of claim 35, wherein the code for jamming jams less than said period of time.

* * * * *